US012619666B2

(12) United States Patent
Stadermann

(10) Patent No.: US 12,619,666 B2
(45) Date of Patent: May 5, 2026

(54) INTEGRATED DOCUMENT SCORING AND PRIORITIZATION SYSTEMS AND METHODS FOR ENHANCED DOCUMENT REVIEW IN E-DISCOVERY

(71) Applicant: Open Text Inc., Wilmington, DE (US)

(72) Inventor: Jan Stadermann, Rheinbach (DE)

(73) Assignee: Open Text Inc., Wilmington, DE (US)

( * ) Notice: Subject to any disclaimer, the term of this patent is extended or adjusted under 35 U.S.C. 154(b) by 0 days.

(21) Appl. No.: 18/668,004

(22) Filed: May 17, 2024

(65) Prior Publication Data

US 2025/0355949 A1     Nov. 20, 2025

(51) Int. Cl.
*G06F 16/93* (2019.01)
*G06N 3/048* (2023.01)
*G06N 3/09* (2023.01)

(52) U.S. Cl.
CPC ............. *G06F 16/93* (2019.01); *G06N 3/048* (2023.01); *G06N 3/09* (2023.01)

(58) Field of Classification Search
None
See application file for complete search history.

(56) References Cited

U.S. PATENT DOCUMENTS 8,620,842 B1 * 12/2013 Cormack ................ G06F 16/93
                                                        706/12
2007/0239632 A1 * 10/2007 Burges ................... G06N 20/00
                                                        706/15
2008/0249999 A1 * 10/2008 Renders ................ G06F 16/355
2010/0312725 A1 * 12/2010 Privault ................. G06N 5/043
                                                        706/54
2020/0218719 A1 * 7/2020 Eifert ...................... G06F 16/35
2020/0364404 A1 * 11/2020 Priestas ........... G06V 30/19173
2021/0011935 A1 * 1/2021 Walsh .................. G06Q 50/184
2021/0042290 A1 * 2/2021 Banipal ................ G06N 3/0499
2021/0334315 A1 * 10/2021 Chang .................. G06F 40/284

(Continued)

OTHER PUBLICATIONS

Barnett et al., "Machine learning classification for document review.". In DESI III: The ICAIL Workshop on Globaal E-Discovery/E-Disclosure. Citeseer, Princeton, NJ, USA. (Year: 2009).*

(Continued)

*Primary Examiner* — Aleksandr Kerzhner
*Assistant Examiner* — Anugeetha Kunjithapatham
(74) *Attorney, Agent, or Firm* — Carr & Ferrell LLP; Myrna M. Schelling

(57) ABSTRACT

Integrated document scoring and prioritization systems and methods for enhanced document review in e-discovery are disclosed herein. An example includes combining a first vector of scores from one algorithm and a second vector of scores from another algorithm, both corresponding to a set of documents. Ground truth labels indicating document responsiveness are also acquired. A system calculates blending weights through a supervised learning algorithm, considering the scores and ground truth labels. These weights are then employed to combine the vector scores, yielding final ranking scores for each document. The system culminates in the creation of a sorted document list, where documents with higher final ranking scores are prioritized, signifying their increased relevance within the dataset.

23 Claims, 10 Drawing Sheets

(56)                    References Cited

U.S. PATENT DOCUMENTS

| | | | |
|---|---|---|---|
| 2022/0027748 A1* | 1/2022 | Muschett | G06F 40/30 |
| 2022/0058496 A1* | 2/2022 | Rusk | G06N 3/0464 |
| 2022/0067456 A1* | 3/2022 | Johnson | G06F 18/2155 |
| 2024/0012878 A1* | 1/2024 | Sydow | G06F 16/35 |
| 2024/0370479 A1* | 11/2024 | Hudetz | G06F 16/316 |

OTHER PUBLICATIONS

Mahoney et al., "Explainable text classification techniques in legal document review: locating rationales without using human annotated training text snippets.", 2022 IEEE International Conference on Big Data. (Year: 2022).*

Pai et al. "Exploration of Open Large Language Models for e Discovery.", In Proceedings of the Natural Legal Language Processing Workshop 2023, pp. 166â177, Singapore, Association for Computational Linguistics. (Year: 2023).*

\* cited by examiner

110

110

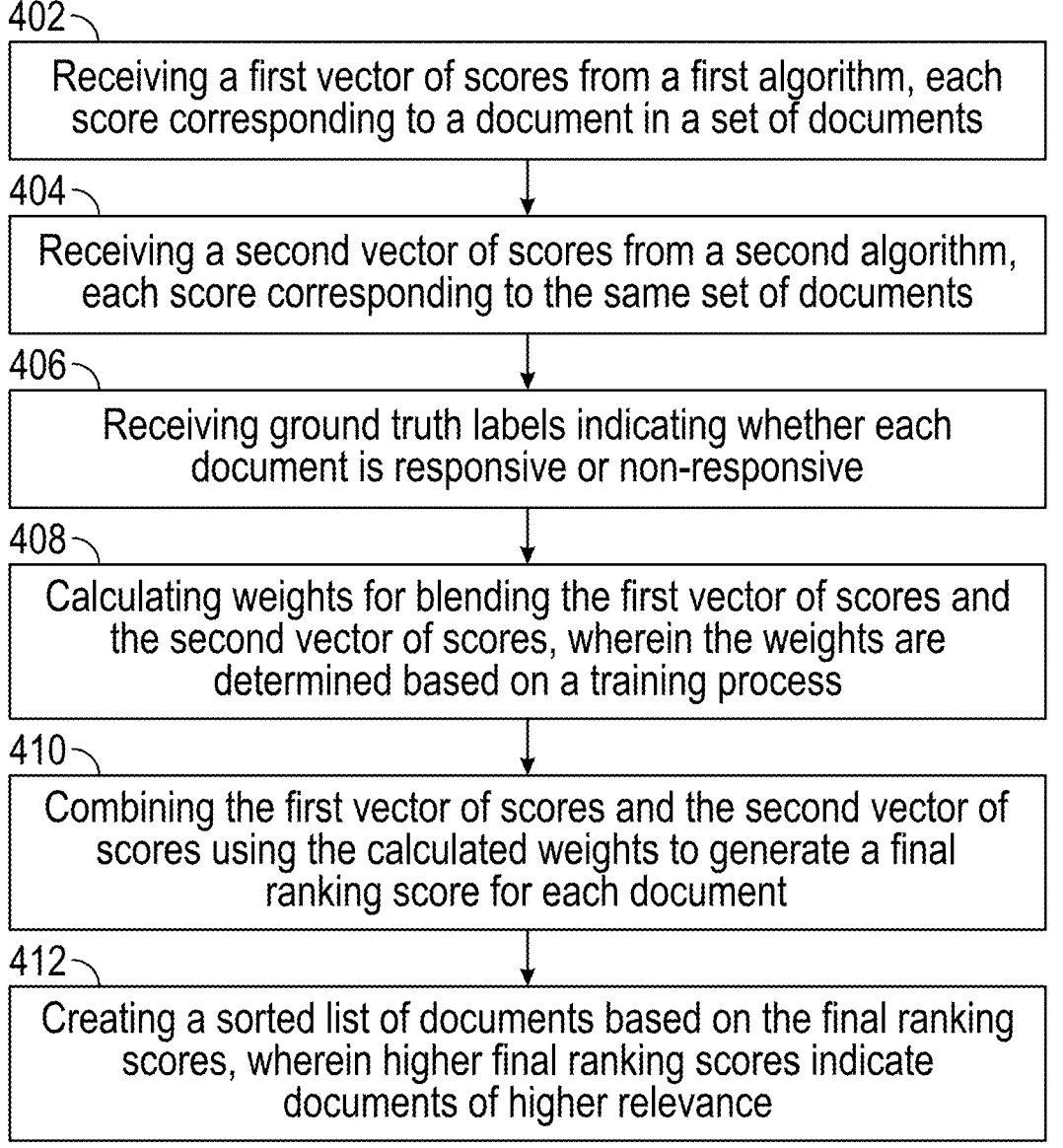

402 — Receiving a first vector of scores from a first algorithm, each score corresponding to a document in a set of documents 404 — Receiving a second vector of scores from a second algorithm, each score corresponding to the same set of documents 406 — Receiving ground truth labels indicating whether each document is responsive or non-responsive 408 — Calculating weights for blending the first vector of scores and the second vector of scores, wherein the weights are determined based on a training process 410 — Combining the first vector of scores and the second vector of scores using the calculated weights to generate a final ranking score for each document 412 — Creating a sorted list of documents based on the final ranking scores, wherein higher final ranking scores indicate documents of higher relevance

FIG. 4

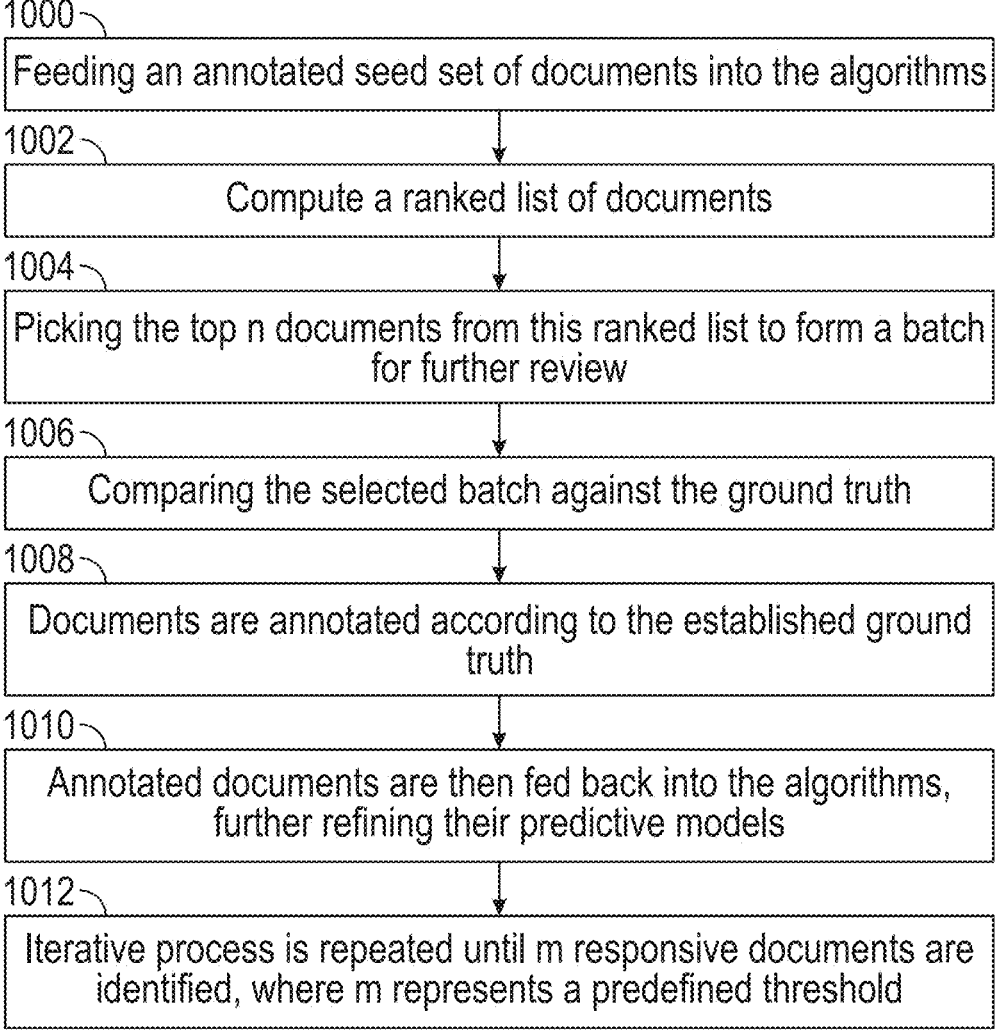

1000

Feeding an annotated seed set of documents into the algorithms

1002

Compute a ranked list of documents

1004

Picking the top n documents from this ranked list to form a batch for further review

1006

Comparing the selected batch against the ground truth

1008

Documents are annotated according to the established ground truth

1010

Annotated documents are then fed back into the algorithms, further refining their predictive models

1012

Iterative process is repeated until m responsive documents are identified, where m represents a predefined threshold

FIG. 10

INTEGRATED DOCUMENT SCORING AND PRIORITIZATION SYSTEMS AND METHODS FOR ENHANCED DOCUMENT REVIEW IN E-DISCOVERY

CROSS-REFERENCE TO RELATED APPLICATIONS

N/A.

FIELD

The present disclosure pertains to document review systems and methods, and more specifically, but not by way of limitation, to integrated document scoring and prioritization systems and methods for enhanced document review in e-discovery.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for enhancing document ranking in an electronic discovery system. The method also includes receiving a first vector of scores from a first algorithm, each score corresponding to a document in a set of documents. The method also includes receiving a second vector of scores from a second algorithm, each score corresponding to the same set of documents. The method also includes receiving ground truth labels indicating whether each document is responsive or non-responsive. It will be understood that ongoing human review can comprise all or part of the ground truth. Thus, the weight calculation can be limited to the documents that have been reviewed. Once weights have been calculated, new scores can be assigned to all or a portion of the documents.

The method also includes calculating weights for blending the first vector of scores and the second vector of scores, where the weights are determined based on a training process. The method also includes combining the first vector of scores and the second vector of scores using the calculated weights to generate a final ranking score for each document. The method also includes creating a sorted list of documents based on the final ranking scores, where higher final ranking scores indicate documents of higher relevance. Other embodiments of this aspect include corresponding computer systems, apparatus, and computer programs recorded on one or more computer storage devices, each configured to perform the actions of the methods.

Implementations may include one or more of the following features. The method where the first algorithm is a support vector machine (SVM). The second algorithm is a document relation engine (DRE). The training process includes utilizing a supervised learning algorithm to estimate the weights using the scores and ground truth labels. The supervised learning algorithm used to estimate the weights is a multi-layer perceptron neural network. The method may include normalizing the scores in the first and second vectors to a predetermined range of values before calculating the weights. The ground truth labels indicate a value of one for responsive documents and a value of zero for non-responsive documents. The final ranking score for each document is calculated by minimizing a squared error between the final ranking score and the ground truth score. The final ranking score for each document is calculated by summing the scores for responsive documents and non-responsive documents separately and then calculating a ratio of those sums. The final ranking score for each document is calculated based on the positions of the documents in the first and second vectors, with documents assigned higher positions for higher relevance. The method may include using a softmax function to normalize a sum of positions when calculating the weights. Implementations of the described techniques may include hardware, a method or process, or computer software on a computer-accessible medium.

One general aspect includes a method for enhancing document ranking in an electronic discovery system. The method also includes receiving a plurality of documents for review. The method also includes generating scores for each document using a first algorithm. The method also includes generating scores for each document using a second algorithm. The method also includes assigning ground truth values (once generated from human review) indicating document responsiveness or non-responsiveness to each document. The method also includes calculating weighted averages of the scores generated based on weights. The method also includes sorting the plurality of documents based on the calculated weighted averages. The method also includes selecting documents for review from the sorted plurality of documents based on sorted positions. Other embodiments of this aspect include corresponding computer systems, apparatus, and computer programs recorded on one or more computer storage devices, each configured to perform the actions of the methods.

One general aspect includes a system. The system also includes a processor and memory for storing instructions, the processor executing the instructions to: receive documents, apply a first algorithm to generate scores for each document, apply a second algorithm to generate scores for each document, assign ground truth values to indicate document responsiveness or non-responsiveness, calculate weighted averages of scores, sort documents based on the calculated weighted averages, and select documents for review.

Implementations may include one or more of the following features. The system where the first algorithm is a support vector machine (SVM) and the second algorithm is a document relation engine (DRE). A training process includes utilizing a supervised learning algorithm to estimate the weights using the scores and ground truth labels, where the supervised learning algorithm is a multi-layer perceptron neural network. The system may include normalizing the scores in a first vector and a second vector to a predetermined range of values before calculating the weights. Ground truth labels indicate a value of one for responsive documents and a value of zero for non-responsive documents. A final ranking score for each document is calculated by minimizing a squared error between the final ranking score and the ground truth score. The final ranking score for each document is calculated by summing the scores for responsive documents and non-responsive documents separately and then calculating a ratio of those sums, and where the final ranking score for each document is calculated based on positions of the documents in first and second vectors, with documents assigned higher positions for higher relevance. The system may include using a softmax function to normalize the sum of positions when calculating the weights. Implementations of the described techniques may include hardware, a method or process, or computer software on a computer-accessible medium.

BRIEF DESCRIPTION OF THE DRAWINGS

Exemplary embodiments are illustrated by way of example and not limited by the figures of the accompanying drawings, in which references indicate similar elements.

FIG. 4 is a flowchart of an example method of the present disclosure.

FIG. 10 is an e-discovery process flow diagram representing the iterative approach to enhancing document ranking through algorithmic scoring, reviewer feedback, and identification of responsive documents.

DETAILED DESCRIPTION OF EXAMPLE EMBODIMENTS

Overview

Figure 1:
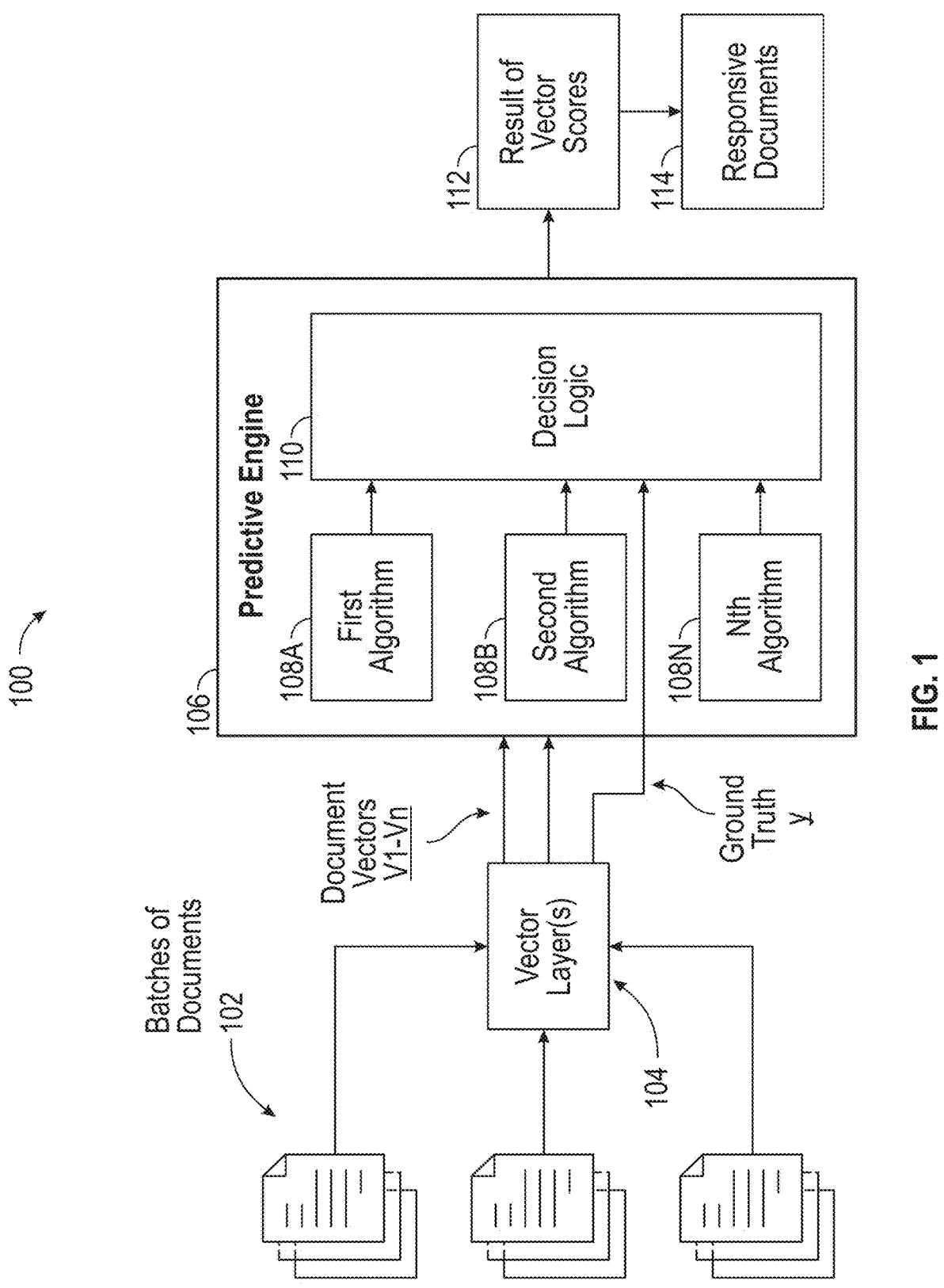
FIG. 1 is an example architectural environment where aspects of the present disclosure can be practiced.

In the realm of document management, one overarching goal is to refine the process of document sorting, focusing specifically on the categorization of documents based on their responsiveness. Traditionally, the established workflow relies on a single predictive algorithm to compute responsiveness scores for each document, primarily informed by human assessments.

Disclosed herein are systems and methods for incorporating multiple prediction algorithms, each providing a unique perspective on document responsiveness. What truly distinguishes these methods is the introduction of a sophisticated integration layer strategically positioned to harness the collective potential of these algorithms. This orchestration layer functions as a conductor, merging the outputs of various algorithms to generate optimized responsive scores for each document within our dataset.

In essence, the systems and methods disclosed herein provide improved document sorting, provide enhanced precision and efficiency in identifying and prioritizing documents based on their inherent relevance. In the field of e-discovery and document review, existing systems and methods often face the challenge of efficiently prioritizing and selecting documents for review. The systems and methods described herein address this problem by introducing an innovative approach to document ranking and selection, enhancing the overall efficiency of e-discovery processes.

Another challenge in e-discovery is the lack of an adaptive and versatile system for integrating multiple predictive algorithms effectively. The systems and methods disclosed herein provide a solution by offering a dynamic framework that combines various prediction algorithms, allowing for improved decision-making and document prioritization.

Furthermore, traditional e-discovery systems may struggle to handle variations in scoring algorithms across different algorithms and data sources. The systems and methods presented here offer a solution by introducing a normalization process that ensures consistent scoring and ranking, thereby facilitating more accurate document selection.

The complexity of training neural networks for predictive coding can be a significant obstacle in e-discovery. The systems and methods discussed in this context aim to simplify the training process by providing insights and guidelines for training neural networks effectively, streamlining the implementation of advanced machine learning techniques.

Lastly, e-discovery systems often lack adaptability to evolving requirements and objectives. The systems and methods described here offer a solution by providing a flexible and customizable platform that can be tailored to specific e-discovery needs, ensuring that users can adapt and optimize their workflows as necessary.

Disclosed herein is a comprehensive method and system designed to significantly enhance the document review process, with a particular focus on the domain of e-discovery. E-discovery entails sifting through vast amounts of electronic documents to identify pertinent information for legal or investigative purposes, making it crucial to employ efficient and accurate review methodologies. This innovative approach combines elements of machine learning, algorithmic evaluation, and ground truth assignment to create a robust document scoring and prioritization system.

In some embodiments, two or more distinct algorithms, each with its own scoring mechanism can be used. These algorithms are tasked with assessing the relevance of a multitude of documents, and their outputs serve as foundational elements. These document scores are generated based on historical human and/or machine decisions, leveraging past reviews to identify patterns and relationships that aid in determining document importance.

In conjunction with the algorithmic scoring, the disclosure incorporates a ground truth assignment process. This step is used for training the algorithms and enhancing the accuracy of the scoring mechanism. Ground truth values are assigned to each document, classifying them as either responsive or non-responsive to specific review criteria. Again, ground truth values can be generated from human reviewer input in some instances.

Machine learning techniques can be applied to the collected data. The weighted averages of the scores generated by both algorithms are calculated, resulting in more nuanced and comprehensive evaluations of document relevance. This machine learning component further adapts and refines the scoring process over time, ensuring that it becomes increasingly effective in identifying important documents.

The final output is a sorted list of documents, arranged in order of their calculated scores. This sorting process is used for optimizing the document review workflow. By presenting reviewers with the most relevant documents at the top of the list, the present technology streamlines the review process, allowing for a more efficient allocation of resources.

In summary, the systems and methods herein represent an advancement in the field of document review, particularly in the context of e-discovery. By integrating multiple algorithms, ground truth assignment (optional and used when available), and machine learning techniques, they provide a comprehensive solution for identifying, prioritizing, and reviewing documents with unparalleled efficiency and accuracy. These systems and methods improve the way legal and investigative teams approach document-intensive tasks, ultimately saving time and resources while improving decision-making processes.

EXAMPLE EMBODIMENTS

FIG. 1 is a schematic diagram of an example system 100 that can be used to practice aspects of the present disclosure. Batches of documents 102 are reviewed by human reviewers, machine review, or combinations thereof, and document vectors are generated at a vector layer 104. Distinct document vectors V1 through Vn are generated and then processed at a predictive engine 106 using a plurality of algorithms. For clarity of description, algorithms have been simplified to a first algorithm 108A, a second algorithm 108B, up to an Nth algorithm 108N. These algorithms can receive ground truths as disclosed herein, as a form of input. The output of the algorithms is then processed by decision logic 110 that generates a result of vector scores 112 that are used to rank and select responsive documents 114.

In more detail, the batches of documents can be processed by human reviewers. Before integration of the SVM (first algorithm 108A) and DRE (second algorithm 108B) algorithms into the process, a human reviewer (or more than one) is initially involved in reviewing a batch of documents. This human reviewer goes through the documents manually to categorize them as either responsive or non-responsive based on their relevance to a particular query or legal case. This manual categorization process involves assessing the content of the documents to determine whether they meet the criteria for responsiveness.

This initial review phase, involving both human and machine assessment, plays a role in the document review process. Firstly, it establishes a benchmark for document responsiveness, creating a repository of ground truth data essential for the subsequent validation and refinement of machine learning algorithms. This early stage also produces a valuable set of labeled data, instrumental in training algorithms such as Support Vector Machines (SVM) and Document Review Engines (DRE), enabling these systems to recognize and learn from the nuances distinguishing responsive from non-responsive documents.

In some instances, the SVM, with appropriate configuration, has the capability for classification, although the primary objective within this workflow is to establish a responsiveness hierarchy. Additionally, the integration of advanced techniques, such as large language models, provides a broadening horizon for enhancing the system's analytical depth and precision. This human-machine collaborative step not only ensures the accuracy and reliability of the automated review process but also enriches the system with practical examples and contextual insights, significantly boosting its performance and decision-making efficacy.

Vectors in machine learning, particularly in the context of document review and natural language processing, serve to convert text data into numerical form so that algorithms can process and analyze the information. The generation of vectors from text data is a crucial step in preparing input for machine learning models.

Before converting text into vectors, the text generally undergoes several preprocessing steps to improve the quality of the data and to make it suitable for vectorization. This could include removing stop words (common words that don't contribute much to the meaning of a document), stemming (reducing words to their root form), and tokenization (splitting text into individual words or phrases).

Once the text is preprocessed, the text is converted into vectors using one of several common techniques such as Bag of Words (BoW), which is a simple and widely-used method to transform text into vectors. In BoW, a document is represented as a vector in a multidimensional space where each dimension corresponds to a unique word in the vocabulary of the entire document set. The value in each dimension represents the frequency of that word in the document. One of the drawbacks of BoW is that it doesn't take into account the order of the words.

Another example is Term Frequency-Inverse Document Frequency (TF-IDF). TF-IDF improves upon the BoW model by taking into account not just the frequency of words in a document, but also how unique the words are across all documents. Words that occur frequently in a document but not in many documents across the set are given higher weights.

Another example includes Word Embeddings (e.g., Word2Vec, GloVe). These are advanced vectorization techniques that capture the semantic meaning and context of words. They represent words as vectors in such a way that words with similar meanings are closer together in the vector space. Word embeddings are pre-trained on large text corpora and can be fine-tuned for specific tasks.

In the context of the document review system described, once the human or machine reviewers categorize a subset of documents, the text content of these documents is likely converted into vectors using one of the above methods. These vectors serve as input to train the machine learning models (SVM and DRE) to automatically categorize the remaining documents in the batch. The vectorization method chosen depends on the specific requirements of the task and the nature of the text data.

However, the algorithms may use any form of representation of the input documents. It is not required that this is vectorized data, nor that all algorithms are using the same representation. For sake of maintainability and performance, the number of different document representations should be limited. The algorithm can, in some instances, provide a sorted list of the documents and (for decision logic proposals according to FIGS. 8 and 9) a score for each list entry.

Also, a vector that represents responsive and non-responsive documents (ground truth y) can be provided directly to the decision logic 110 of the predictive engine 106 to provide context or a reference point for the decision-making process. In machine learning and predictive analytics, such vectors often represent labeled data or ground truth, which are used for supervised learning. By supplying the decision logic with this vector, the system can calibrate or adjust its final decision based on actual outcomes or classifications. This direct input ensures that the decision logic doesn't solely rely on algorithm-generated scores but also considers real-world data or prior classifications to make a more informed and accurate final decision. In essence, it's a way of combining the machine's predictions with known outcomes to optimize the final results.

As noted above, the vectors generated from previously reviewed documents can be processed by the algorithms 108A-108N. Again, while SVM and DRE are referenced, it will be understood that the number of, or diversity of algorithms used by the predictive engine 106 may vary. In the described system, Support Vector Machines (SVM) and Document Relation Engine (DRE) are mentioned as the algorithms used for prediction. However, there are various other machine learning and natural language processing algorithms that can be utilized for similar tasks in document analysis and prediction, depending on the specific requirements and characteristics of the dataset. Some alternative algorithms and approaches include any example ensemble learning method for classification tasks, known for robustness and ability to handle high-dimensional data. Another example is a Naive Bayes that includes a probabilistic algorithm suitable for text classification, especially for spam detection and sentiment analysis.

Other examples include XGBoost, LightGBM, and CatBoost, which are gradient-boosting techniques often excelling in structured and tabular data analysis. Deep learning neural networks, such as convolutional neural networks (CNNs) and recurrent neural networks (RNNs), are suited for more complex document analysis tasks, including text generation, machine translation, and image recognition. Latent Dirichlet Allocation (LDA) serves as a useful method for topic modeling, identifying hidden topics within a corpus of documents.

Techniques like Word Embeddings, including Word2Vec, GloVe, and FastText, capture semantic relationships between words, enhancing models for document analysis. Long Short-Term Memory (LSTM), a type of recurrent neural network, is specifically designed for sequence prediction tasks and applicable to document-related tasks like text summarization. K-Nearest Neighbors (K-NN) offers a simple yet effective approach for classification and regression tasks through similarity measures between data points. Clustering algorithms and techniques, such as K-Means and DBSCAN, are utilized for grouping similar documents, while Topic Modeling algorithms like Non-Negative Matrix Factorization (NMF) extract topics or themes from a collection of documents.

Once the vectors have been processed by the algorithms 108A-108N, the data are then provided to the decision logic 110 of the system 100. The decision logic 110 can use various methods for engaging in document review.

Figure 2:
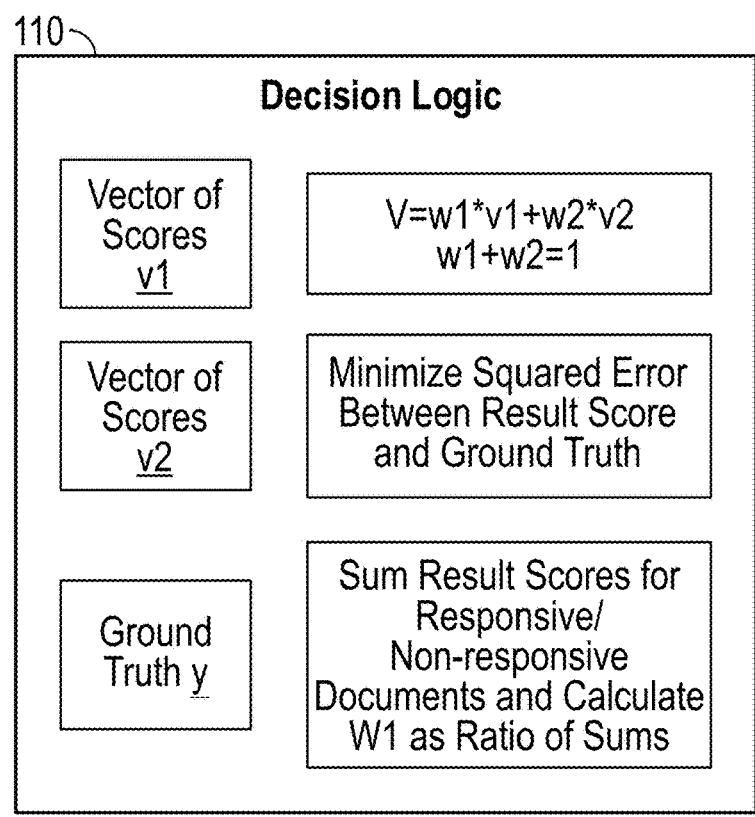
FIG. 2 is a diagrammatic flow of one method of decision logic.

In one method, as illustrated in FIG. 2, the decision logic 110 (see FIG. 1) employs an equation (V=w1*v1+w2*v2) that serves as a weighted combination of two vectors v1 and v2. These vectors could represent certain features or scores extracted from the documents. The weights w1 and w2 are responsible for determining the significance or relevance of each vector in relation to a final decision score V. Given the constraint w1+w2=1, it ensures that the combined influence of these two vectors sums up to unity.

An aspect of the decision logic process is the minimization of the squared error between the computed result score and the ground truth. The ground truth here refers to the actual categorization of the document as responsive or non-responsive, possibly determined by human reviewers/machines or a predefined benchmark. By minimizing the squared error, the model's predictions are refined to align closely with this ground truth, enhancing its accuracy and reliability.

Furthermore, result scores for both responsive and non-responsive documents are aggregated. This sum provides a holistic view of the relevance of the entire batch of documents. The weight w1 is then calculated as a ratio of these sums. By doing so, the model dynamically adjusts the significance of the vector v1 based on the collective relevance of the entire document set. This ensures that the decision logic takes into account both individual document scores and the overarching trends in the entire batch, optimizing the categorization process.

In the context of the previously discussed document review system, this decision logic method offers a sophisticated approach to automate categorization. By combining feature vectors, minimizing errors with actual categorizations, and dynamically adjusting weights based on aggregate scores, the model can effectively categorize documents as responsive or non-responsive, enhancing the efficiency and accuracy of the review process.

Figure 3:
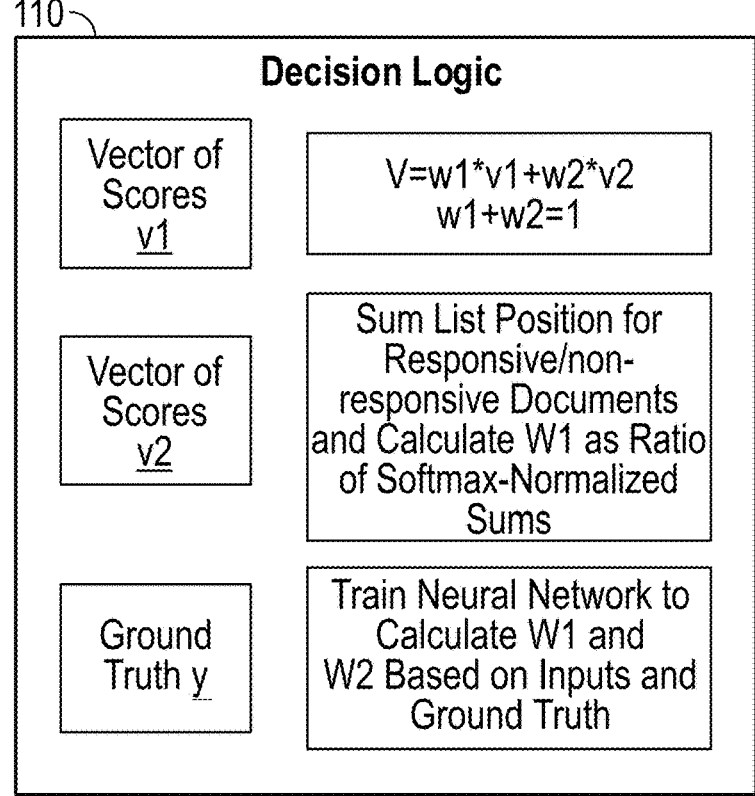
FIG. 3 is a diagrammatic flow of another method of decision logic.

Another example decision logic method, as illustrated in FIG. 3, includes fusing two distinct scoring vectors, v1 and v2. The methodology relies on a weighted combination of these two vectors to arrive at a final score, V. The equation V=w1*v1+w2*v2 elucidates this, where w1 and w2 are the weights assigned to the scores in vectors v1 and v2, respectively. A critical constraint here is that the sum of weights w1 and w2 is strictly bounded to 1, ensuring that the weights act as relative importance factors and don't skew the result disproportionately.

A feature of this approach is the way the weight w1 is determined. By summing up the list positions for documents categorized as responsive or non-responsive, the method offers a dynamic way to calculate w1. This weight is further refined using a ratio of softmax-normalized sums, a technique employed in machine learning to convert raw scores into probabilities. This ensures that the weights derived are both balanced and proportionally representative of the underlying data.

However, the adaptability of this framework involves the introduction of a neural network. By training this network on the input scores from v1 and v2, along with a set ground truth y, the system learns the optimal weights 'w1' and 'w2'. Neural networks can discern intricate patterns and relationships in vast datasets, making the decision logic robust and adaptive. This approach exemplifies the merging of heuristic-based decision-making with data-driven insights, catering to both structured and unstructured data scenarios.

FIG. 4 illustrates an example method of the present disclosure for enhancing document ranking in an electronic discovery system. The method begins in step 402 by obtaining a first vector of scores from a designated first algorithm. Each score within this vector is linked to a specific document found in a predefined set of documents. This vector essentially encapsulates the assessment or rating of every document as perceived by the first algorithm.

Subsequently, in step 404, a second vector of scores is acquired from a distinct second algorithm. Similar to the first vector, each score in this second vector correlates to a document within the same aforementioned set of documents. This second vector offers an alternative perspective or evaluation of the documents, as gauged by the second algorithm.

In addition to the scores from the algorithms, the method includes a step 406 of receiving what are termed "ground truth labels." These labels distinctly indicate whether a given document is deemed "responsive" or "non-responsive." Such labels provide a concrete, definitive classification for each document, serving as a reference or benchmark against which algorithmic assessments can be compared or validated.

With the input data in place, the method proceeds to a step 408 to compute weights specifically for the purpose of blending or merging the scores from the first and second vectors. The determination of these weights is not arbitrary; instead, they are derived from a systematic training process, ensuring that they are optimized for the most accurate and effective blending of the two score vectors.

Leveraging the previously calculated weights, the method combines the scores from the first and second vectors in step 410. This blending process yields a final ranking score for each document in the set. It's a synthesis of evaluations from both algorithms, fine-tuned by the weights, to produce a more holistic and refined assessment for each document.

To conclude the process, the method generates a sorted list of all the documents from the set, in step 412. The arrangement or order of this list is determined by the final ranking scores, with documents possessing higher scores indicating greater relevance. This list, therefore, offers a prioritized view of the documents based on their combined assessments from both algorithms and the weighting process.

In the described method, the first algorithm employed is identified as a Support Vector Machine (SVM). This algorithm plays a role in generating the initial vector of scores that evaluate the documents in the given set. Also, the second algorithm that's leveraged in this process is a Document Relation Engine (DRE). This engine offers an alternative evaluation of the same set of documents, providing a distinct vector of scores.

The training process, used for determining the weights for blending the scores from both algorithms, makes use of a supervised learning algorithm. This algorithm harnesses both the scores and the ground truth labels to estimate the optimal weights. A more specific variant of the supervised learning algorithm used in this training process is a multi-layer perceptron neural network. This neural network facilitates a deeper and more nuanced estimation of the weights.

Before delving into the weight calculation, the method involves an extra step of normalization. The scores present in both the first and second vectors undergo a normalization process, aligning them to a predetermined range of values. Ground truth labels play a role in the method, serving as benchmarks. These labels use a simple binary representation; a value of one for responsive documents and zero for those that are non-responsive.

The final ranking score for each document can be computed through multiple methods. One approach involves minimizing the squared error between the resulting score and the ground truth score, ensuring the closest approximation to the benchmark. An alternative approach for calculating the final ranking score involves summing the scores for responsive and non-responsive documents separately. Once these summations are complete, a ratio of the two sums is computed to arrive at the final score. Yet another method to determine the final ranking score takes into account the relative positions of the documents in both the first and second vectors. In this method, documents are assigned higher positions based on their assessed relevance.

For those utilizing position-based ranking, a softmax function can be employed. This function normalizes the sum of the positions, ensuring they fall within a specific range, and is particularly useful when calculating the weights.

FIGS. 5-9 collectively illustrate example schematics and flow diagrams of embodiments of the present disclosure. In enhancing e-discovery through Technology Assisted Review (TAR) with predictive coding, an approach has been introduced that significantly improves the efficiency and accuracy of document sorting by their responsiveness. As noted above, e-discovery workflows have relied on the application of a singular prediction algorithm, such as a Support Vector Machine (SVM), to calculate a responsive score for each document. This score is primarily determined based on prior human review decisions, which assess the relevance and responsiveness of documents to specific legal matters.

The embodiments disclosed involve the simultaneous application of multiple prediction algorithms. By operating in parallel, these algorithms each contribute unique perspectives on document responsiveness, thereby encompassing a broader analysis spectrum. To synthesize the outputs from these algorithms into a cohesive scoring system, a combination layer is introduced. This layer is used in integrating the various scores, deriving optimized responsive scores for each document in the dataset.

The combination layer incorporates weight parameters, which play a role in the amalgamation process. These weights are not arbitrarily assigned; instead, they are estimated based on a comprehensive analysis of available human review decisions. By examining the patterns and outcomes of these decisions, the system intelligently adjusts the weight parameters, ensuring that the combined responsive scores accurately reflect the documents' relevance. This methodology presents an advancement in TAR, offering a more nuanced and effective tool for prioritizing documents in e-discovery.

Figure 5:
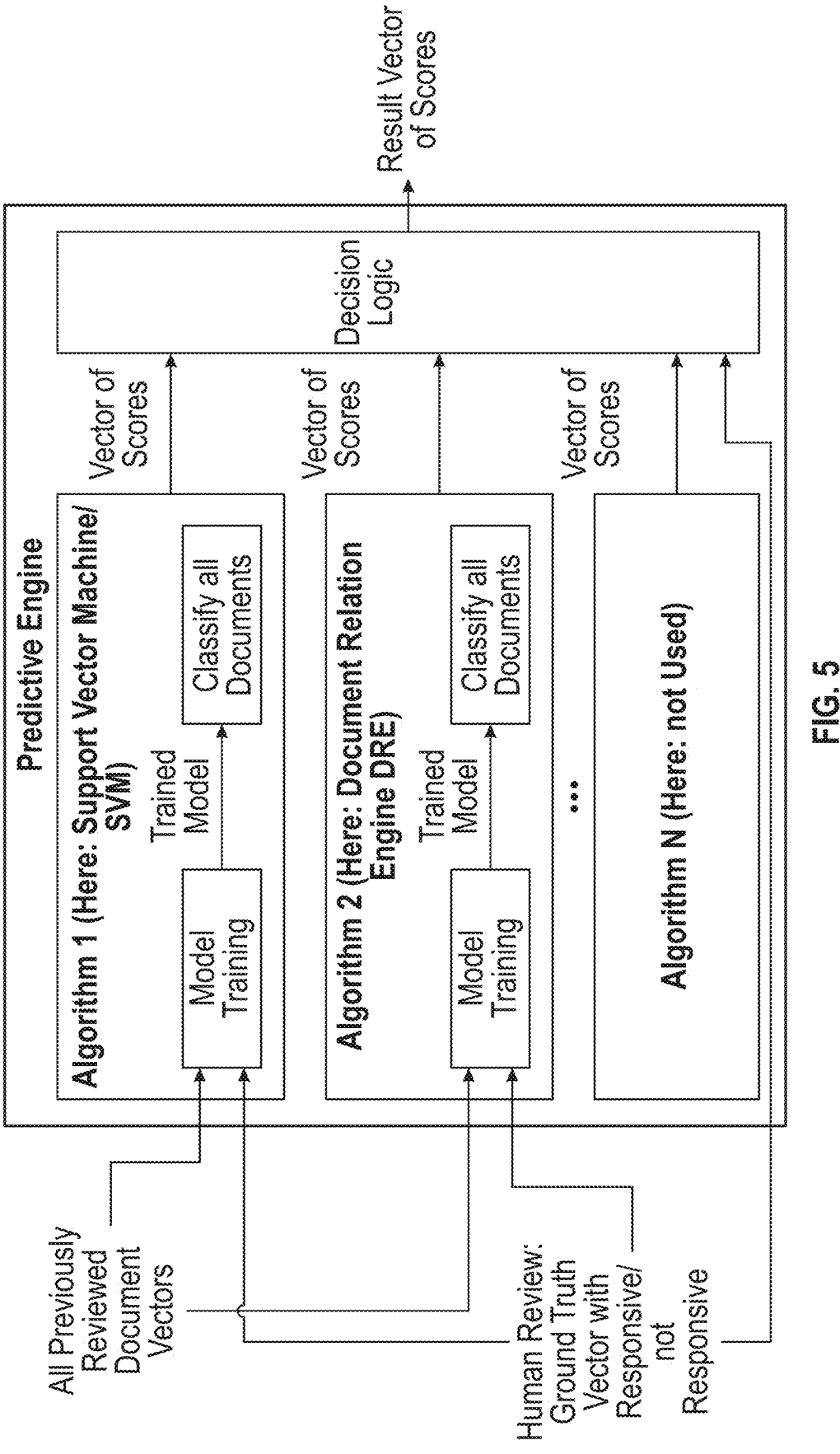
FIG. 5 is a schematic for an e-discovery Technology Assisted Review (TAR) system illustrating the integration of multiple algorithms for document scoring and the decision logic for calculating final ranking scores.

In more detail, FIG. 5 illustrates a schematic for an e-discovery Technology Assisted Review (TAR) with predictive coding aimed at re-ranking documents to determine their relevancy. The system is predicated on leveraging multiple algorithms to rank a collection of documents and employing a decision logic that assigns weights to each algorithm's output to calculate a final ranking score.

The predictive coding process starts with input from previously reviewed documents, which provide document vectors to the system. These vectors serve as training data for the predictive algorithms and are indicative of human-reviewed outcomes, labeled as 'Responsive' or 'Not responsive.' This ground truth data is essential for the model training phase, where it informs the algorithm of the characteristics that distinguish responsive documents from non-responsive ones.

Algorithm 1, designated as a Support Vector Machine (SVM), is one of the primary algorithms used in this process. The SVM is responsible for generating a vector of scores based on the model it develops during its training phase. These scores are reflective of the likelihood that each document in the set is responsive, as determined by the SVM's classification logic.

Similarly, Algorithm 2, identified as a Document Relation Engine (DRE), undergoes a parallel training and classification process. It also produces a vector of scores, which may be based on different criteria or document features compared to the SVM. The DRE's distinct approach to document classification provides a complementary perspective on the data set. The system is designed to accommodate additional algorithms, as indicated by the placeholder for Algorithm N.

The vectors of scores from each active algorithm (SVM, DRE, etc.) are then processed by the decision logic. This logic layer applies weighted voting to these inputs, considering the human review decisions as a basis for tuning the weights. The decision logic synthesizes the information, yielding a result vector of scores that reflect a consensus ranking from the combined algorithms.

The output, a result vector of scores, represents the re-ranked documents, ordered by their calculated relevance to the query or legal case. This final score vector is used to prioritize the documents for subsequent review stages, thereby enhancing the efficiency of the e-discovery process.

Figure 6:
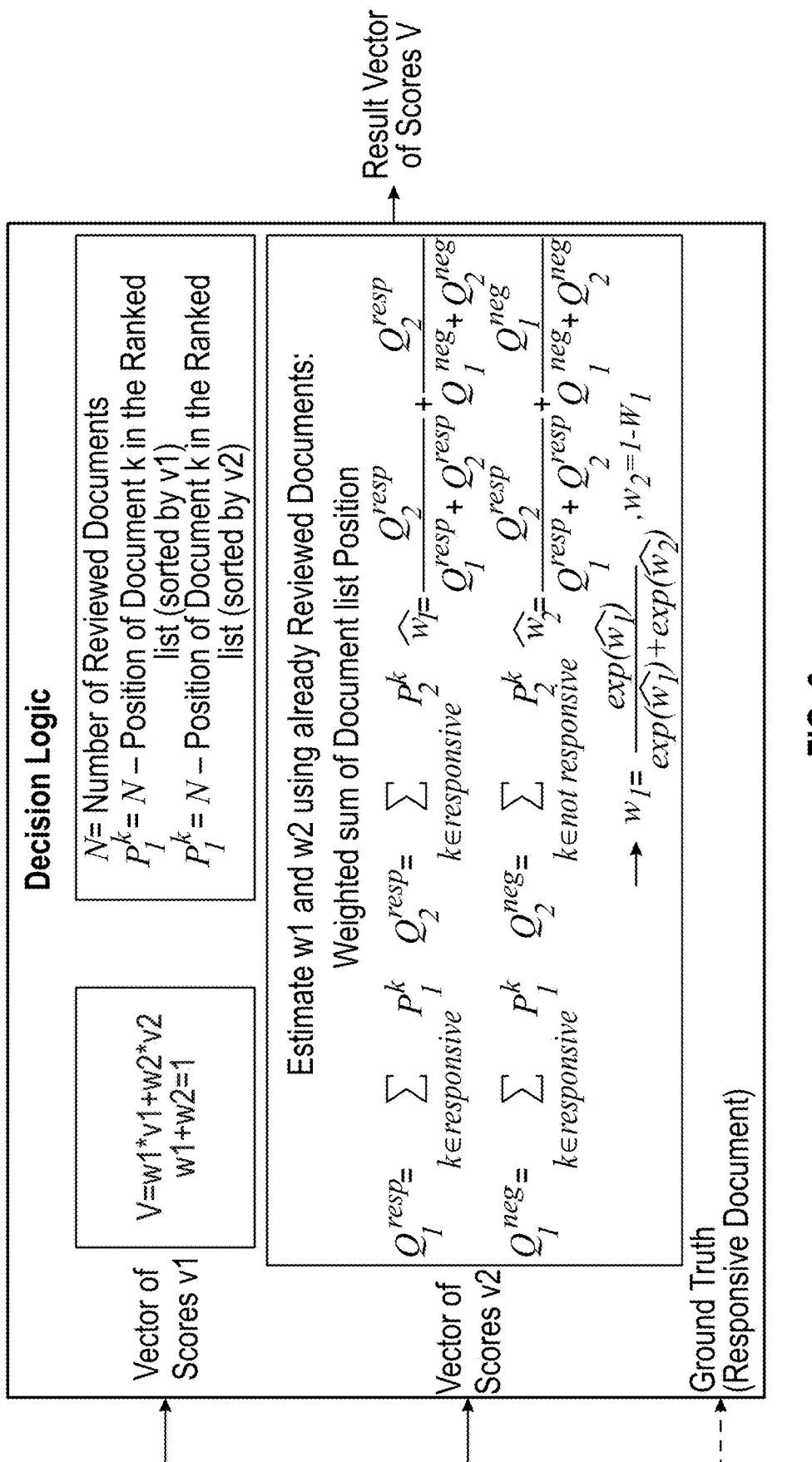
FIG. 6 is a decision logic model demonstrating the calculation of weighted sums from vectors of scores generated by multiple algorithms to determine the final ranking of documents.

FIG. 6 illustrates a decision logic model for weighted sums, which is part of an e-discovery TAR system. This model integrates the output of multiple algorithms to produce a result vector of scores that ranks documents based on their predicted relevance.

Inputs to the model are two vectors of scores, labeled as v1 and v2. These vectors represent the individual rankings from separate algorithms, and they are to be combined using the model's decision logic. The decision logic employs a mathematical formula to calculate a weighted sum of the two vectors, $V=w1v1+w2v2$, subject to the constraint that $w1+w2$ equals 1. This ensures the final result vector V is a balanced combination of the two input vectors.

The decision logic determines the position of each document k within the ranked lists generated by each algorithm (sorted by v1 and v2). The number of reviewed documents is denoted by N, and the positions p1 and p2 for each document in their respective ranked lists are calculated by subtracting the document's rank from N.

The model refines the weights w1 and w2 using already reviewed documents, which serve as a reference for the weighted sum of document list positions. Two sums are computed: one for documents deemed responsive (q1^resp) and another for non-responsive documents (q1^neg), each sum aggregating the positions of documents as ranked by v1. Equivalent sums (q2^resp and q2^neg) are computed for the list sorted by v2.

These sums are then used to calculate weights w1 and w2, using a ratio of the sums for responsive and non-responsive documents, normalized by the softmax function. The softmax function here is used to convert the weighted sums into a probabilistic distribution, ensuring that the weights are bounded between 0 and 1 and sum to 1. The output of the decision logic is the result vector of scores V. This result vector represents the final ranked list of documents, ordered by their combined scores from both algorithms, adjusted by the estimated weights.

Figure 7:
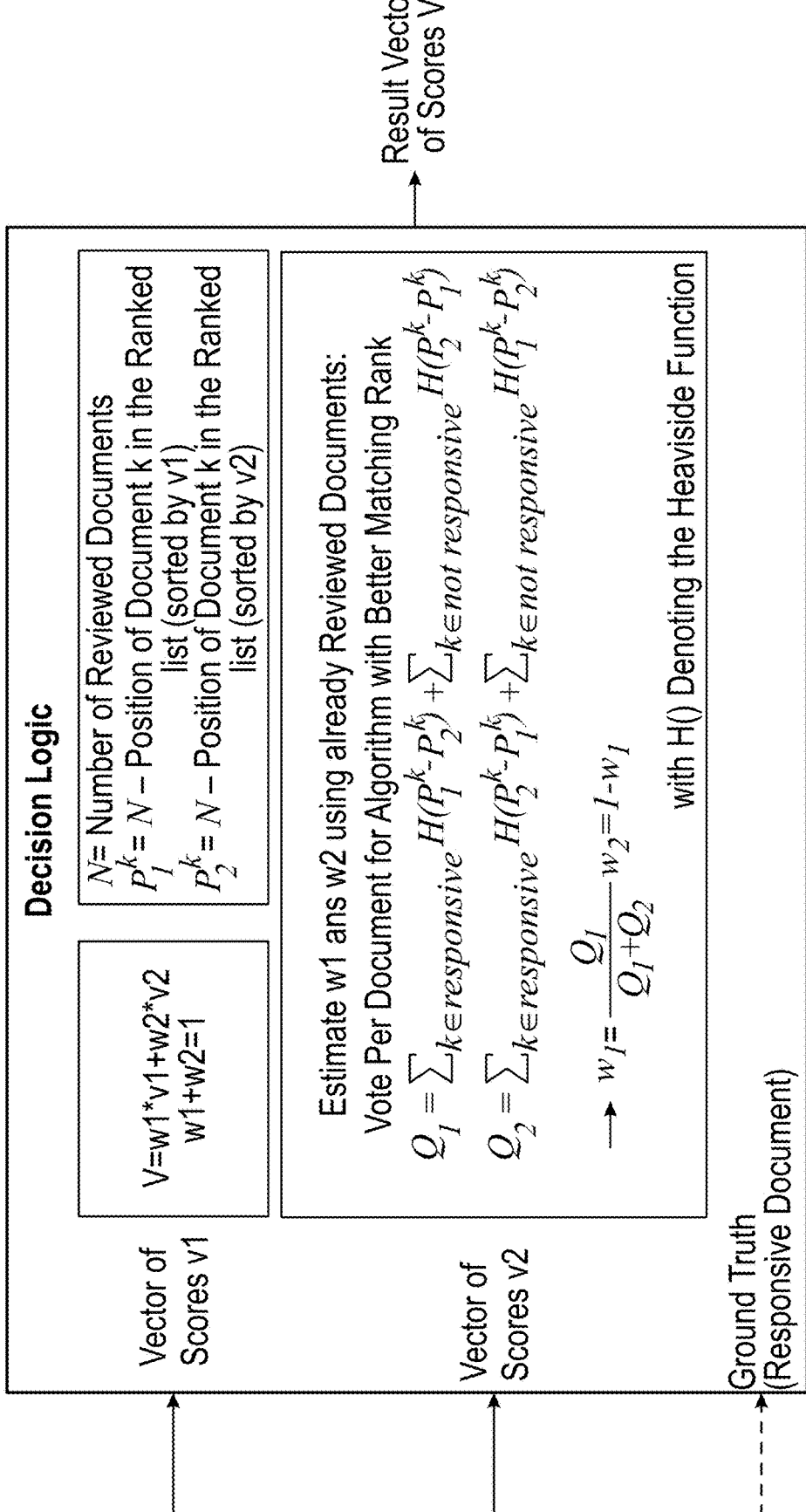
FIG. 7 is an illustration of a voting-based decision logic model within an e-discovery system, which integrates scores from different algorithms to rank documents according to their relevance.

FIG. 7 illustrates a decision logic model based on voting, used within an e-discovery TAR system for predictive coding and re-ranking of documents. This model is predicated on the mathematical integration of outputs from two distinct scoring algorithms to deduce a final result vector of scores that effectively ranks documents by relevance.

The model begins by accepting two vectors of scores as inputs: 'Vector of scores v1' and 'Vector of scores v2'. Each vector represents the ranking outputs from separate algorithms, based on their assessments of the documents. A weighted sum approach is used which is described by the equation $V=w1v1+w2v2$, constrained by the requirement that the sum of weights w1 and w2 must equal 1. This ensures the final score vector V is a normalized blend of the input vectors.

The process includes a feature for estimating the weights w1 and w2, which is based on the vote per document for the algorithm with the better matching rank. This is illustrated through the equations for Q1 and Q2, which are summations of the differences in positions for each document k between the two ranked lists, modulated by the Heaviside step function H. The function H counts the vote for an algorithm when its ranking is better than the other. The weights w1 and w2 are then calculated as a ratio of Q1 to the sum of Q1 and Q2, with w2 being the complement of w1 to maintain the total weight as 1.

The ground truth data for responsive documents is used to inform and adjust the weighting process, ensuring that the final result vector of scores V is reflective of both the algorithmic assessments and the actual document relevance as determined by human review. The output of the model is the 'Result vector of scores V', which represents the re-ranked list of documents according to their calculated relevance, ready for review prioritization.

Figure 8:
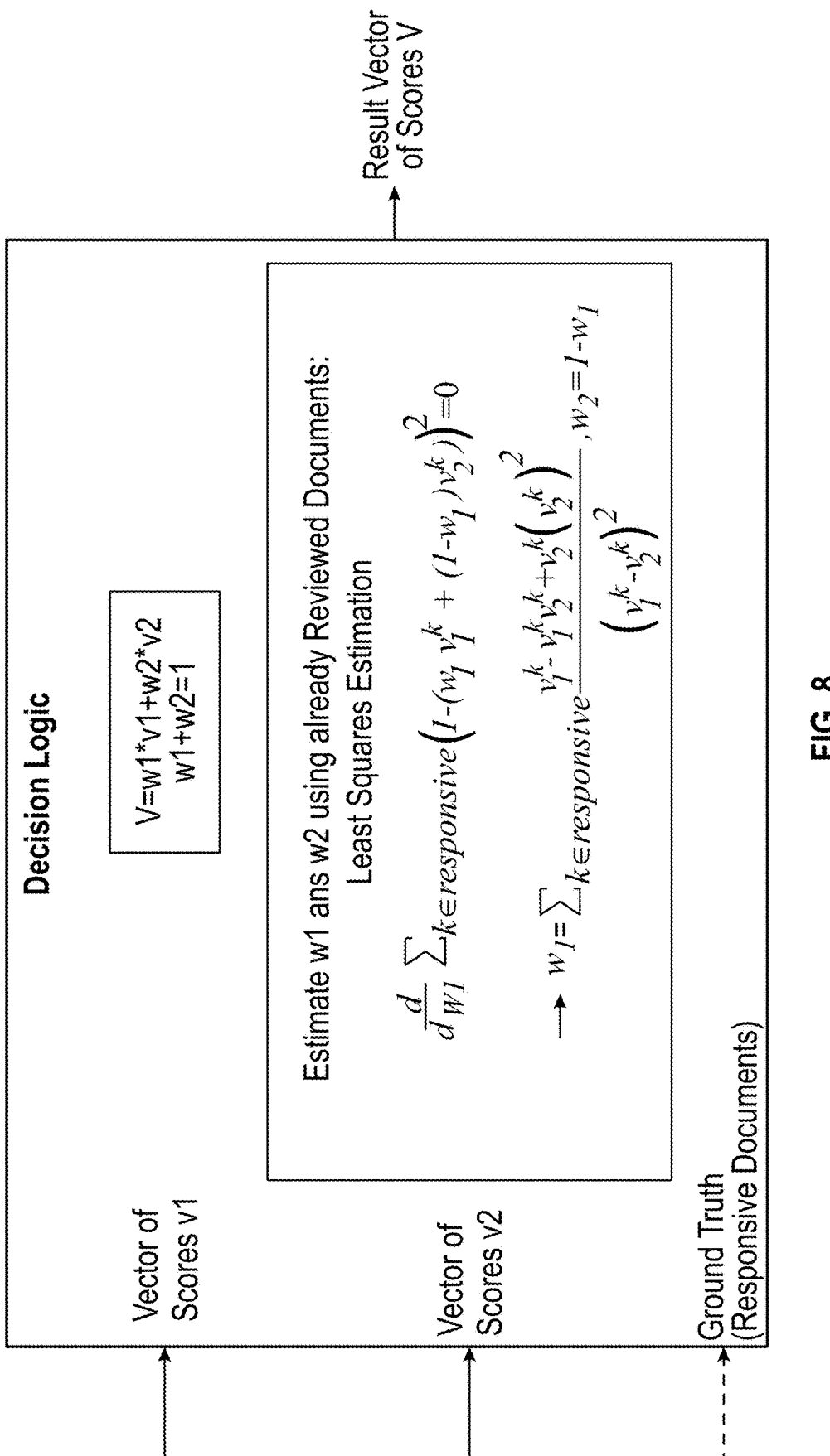
FIG. 8 is a depiction of a least squares estimation technique used in decision logic to combine algorithmic scores for optimal document ranking in e-discovery.

FIG. 8 illustrates a decision logic model employing the least squares estimation technique within an e-discovery TAR system. This model is engineered to fuse the outputs of two scoring algorithms to generate a result vector of scores for document ranking.

Two vectors of scores, v1 and v2, are input into the decision logic model, each corresponding to the scores assigned to documents by separate algorithms. The decision logic then combines these vectors using a weighted sum formula, $V=w1v1+w2v2$, adhering to the constraint that the sum of the weights w1 and w2 is equal to 1. This constraint ensures that the final result is a balanced combination of both algorithms' scores.

To refine the weights w1 and w2, the model applies a least squares estimation approach, leveraging already reviewed documents as a dataset for optimization. The model seeks to minimize the sum of the squares of the differences between the predicted scores and the actual scores, as determined by the ground truth. This is achieved by taking the derivative of the sum with respect to w1 and setting it to zero, which provides the optimal value of w1 that minimizes the error. Consequently, w2 is deduced by subtracting w1 from 1.

Ground truth data, representing the actual responsiveness of documents as determined by prior review, is used to guide and validate the estimation process. The resulting vector of scores, V, is the output of the model, representing the re-ranked list of documents based on their combined scores from both algorithms, optimized by the least squares estimation.

Figure 9:
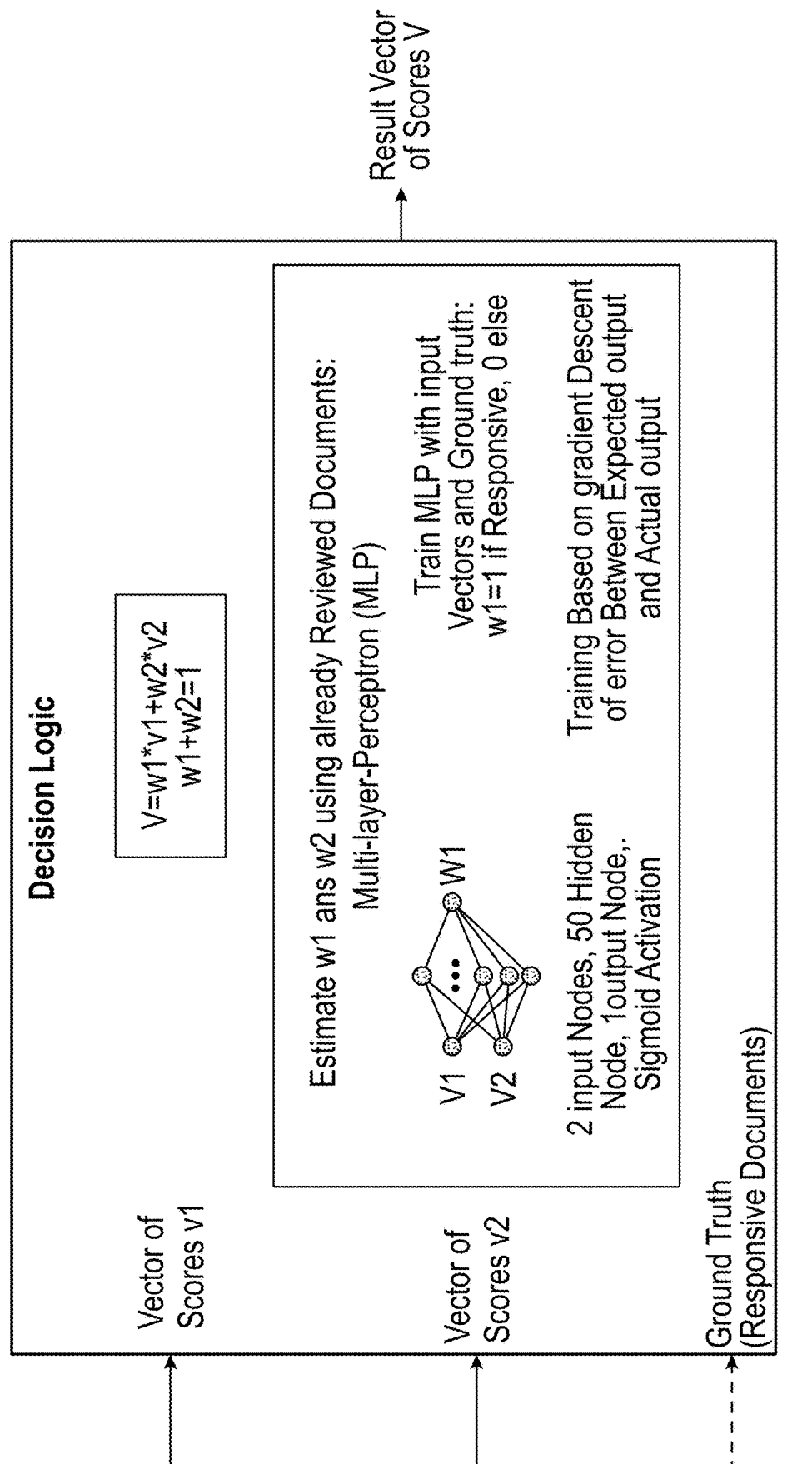
FIG. 9 is a diagram showing a decision logic model that employs a Multi-Layer Perceptron (MLP) neural network to train weight values for scoring algorithms in an e-discovery system.

FIG. 9 illustrates a decision logic model leveraging a neural network, specifically a Multi-Layer Perceptron (MLP), for the purpose of training weight values within an e-discovery TAR system. This decision logic model is employed to determine the optimal combination of scores from two distinct document-ranking algorithms to generate a final result vector of scores, V, for document relevancy ranking.

In this model, the system ingests two score vectors, v1 and v2, as inputs, corresponding to the assessments from two different algorithms. The decision logic then employs a weighted sum approach, articulated by the equation $V=w1v1+w2v2$, with the constraint that w1 and w2 must sum to 1. This ensures the final score vector is a properly normalized amalgamation of the input score vectors.

To estimate the weights w1 and w2, the model utilizes an MLP neural network. The MLP comprises two input nodes, which correspond to the input vectors v1 and v2, hidden nodes that facilitate the abstraction and interaction of features, and a single output node with a sigmoid activation function. The sigmoid activation function is chosen for its ability to map the output values between 0 and 1, making it suitable for binary classification tasks such as document responsiveness.

The neural network is trained using input vectors and ground truth data, where the ground truth represents the actual responsiveness of documents—marked with w1=1 for responsive documents and w1=0 otherwise. The training is conducted via gradient descent, a method that iteratively adjusts the weights to minimize the error between the network's predicted output and the actual output.

The result of this training is a set of optimized weights w1 and w2, which are then used to compute the final result vector of scores V. This vector represents the re-ranked list of documents, arranged according to their computed relevance, as determined by the integrated assessments of both algorithms and refined through the neural network's learned weights.

FIG. 10 illustrates another related method for an e-discovery process, the method begins with feeding an annotated seed set of documents into the algorithms 1000. This seed batch consists of documents that have already been reviewed and categorized, providing a baseline of 'ground truth' for the algorithms to learn from. These annotations can include labels marking each document as responsive or non-responsive to the legal matters in question. The seed set serves as the training data for the algorithms, allowing them to identify patterns and features that correlate with document relevance.

Once the seed set is ingested, the algorithms proceed to compute a ranked list of documents 1002. This ranking is based on the likelihood of document responsiveness as inferred from the training data. The algorithms apply learned weights to the features extracted from the documents, scoring each one accordingly. The outcome is a prioritized list, with documents most likely to be relevant to the case at the top.

The next phase involves picking the top N documents from this ranked list to form a batch for further review 1004. The selection of N is strategic; choosing too few may slow down the discovery process, while too many could overwhelm the review team with potentially irrelevant documents.

The correctness of the algorithms' rankings is then measured by comparing the selected batch against the ground truth 1006. Each document from the batch is reviewed to determine if it is indeed responsive or non-responsive. This step is used to validate the effectiveness of the algorithms' predictive capabilities.

Subsequent to the correctness measurement, the documents are annotated according to the established ground truth 1008. This annotation involves marking each document with its correct classification based on a thorough review. These annotated documents are then fed back into the algorithms, further refining their predictive models 1010.

This iterative process is repeated until M responsive documents are identified, where M represents a predefined threshold 1012, such as 80% of all available responsive documents for a selected issue. The test result, or the measure of efficiency, is the number of documents that have been annotated to reach this threshold of M responsive documents. This metric reflects the TAR system's effectiveness and the efficiency of the review process, highlighting the number of documents that needed to be reviewed before achieving the desired level of discovery.

In sum, the algorithm combination adds robustness to e-discovery TAR as it is able to dynamically switch to the one algorithm that better matches the past (human) review decisions. The choice of selection algorithms can be guided according the preferences of one skilled in the art. To be sure, the proposed selection methods are extendable to N algorithms.

Example Use Cases

In the complex world of legal proceedings, time is of the essence, and the need to sift through mountains of documents can be overwhelming. This technology revolutionizes legal document review and e-discovery processes. When a new case is opened, all relevant documents are scanned and fed into the system. The AI-powered system meticulously analyzes each document, applying a combination of Support Vector Machines (SVM) and Document Relation Engine (DRE) algorithms.

The system's first step involves categorizing documents as responsive or non-responsive, thereby efficiently filtering out irrelevant information. Once the initial categorization is complete, the technology goes a step further by identifying the most pertinent documents based on past human decisions and user-defined criteria.

Legal professionals are presented with a prioritized list of documents, ensuring that they focus their efforts on the most crucial pieces of evidence. This not only accelerates the e-discovery process but also minimizes the risk of missing critical information. The end result is a streamlined, cost-effective, and accurate legal document review that empowers legal teams to make informed decisions.

In the healthcare industry, the importance of quick access to accurate patient data cannot be overstated. The technology is a game-changer in the analysis of medical records, from patient histories to treatment plans. When medical records are uploaded into the system, it employs its AI capabilities to extract and categorize vital information.

The system can recognize patient demographics, diagnoses, prescribed medications, and treatment timelines, transforming unstructured data into a structured, actionable format. Healthcare professionals benefit from an intuitive platform that facilitates rapid decision-making, enabling them to provide more efficient and personalized patient care.

Doctors, nurses, and administrators no longer need to sift through voluminous paperwork. Instead, they can access patient information instantly, leading to better patient outcomes and improved hospital operations.

Financial institutions and auditing firms face the formidable task of examining countless financial documents for compliance, fraud detection, and financial analysis. This technology offers a robust solution to expedite the process and enhance accuracy.

When financial reports, invoices, and receipts are uploaded, the system employs its algorithms to extract critical data points, such as transaction amounts, dates, and payees. It can identify discrepancies or irregularities in financial statements, potentially signaling fraudulent activities.

By automating data extraction and analysis, financial professionals can focus their efforts on higher-level tasks, such as strategy development and risk management. The system ensures that financial documents are thoroughly reviewed, reducing the likelihood of human error and oversight.

Figure 11:
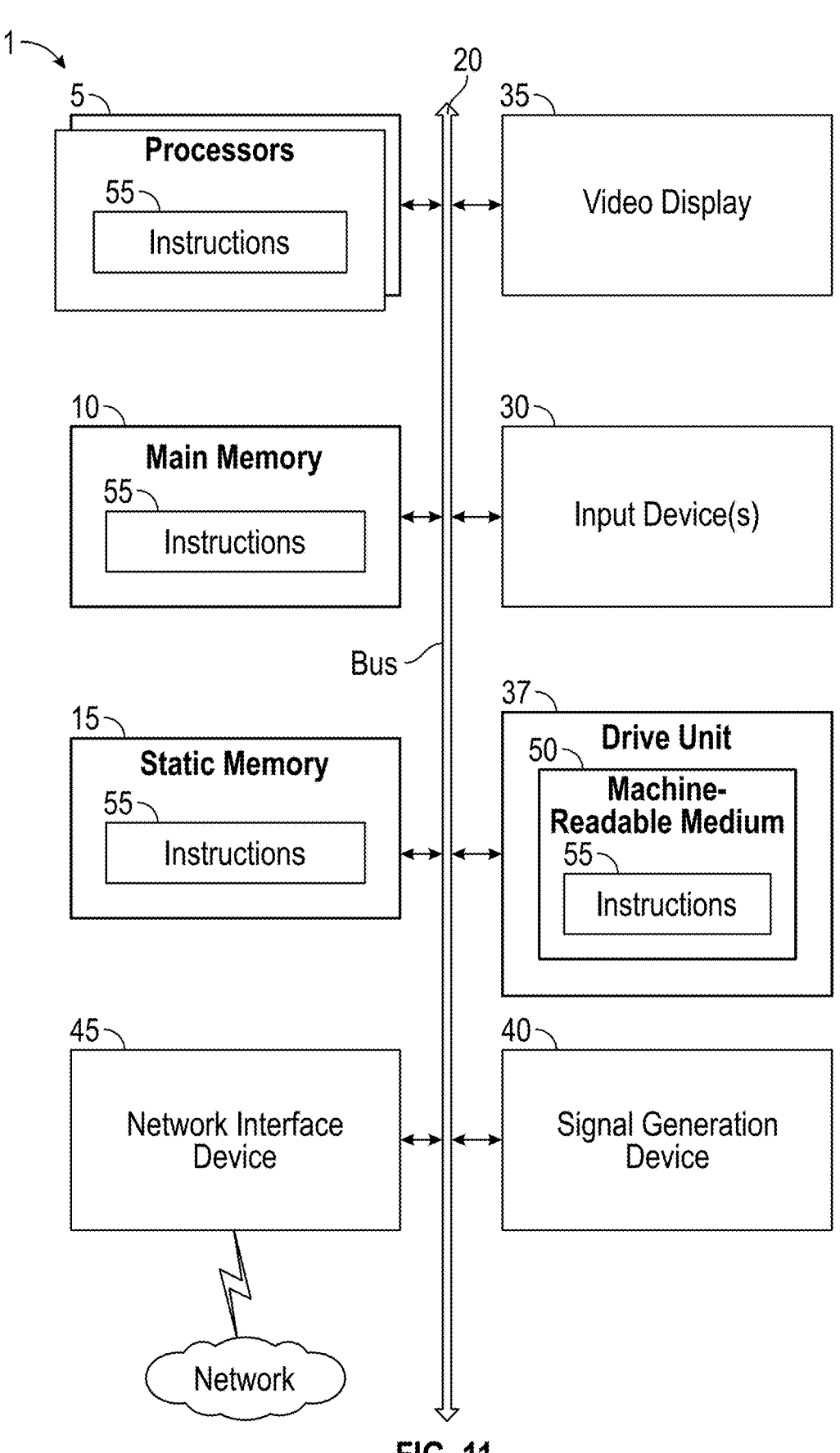
FIG. 11 is a schematic diagram of an example computer system that can be used to implement embodiments of the present disclosure.

FIG. 11 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Where appropriate, the functions described herein can be performed in one or more of hardware, software, firmware, digital components, or analog components. For example, the encoding and or decoding systems can be embodied as one or more application specific integrated circuits (ASICs) or microcontrollers that can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In this description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

What is claimed is:

1. A method for enhancing document ranking in an electronic discovery system, comprising:

feeding an annotated seed set of documents into a first predictive algorithm and a second predictive algorithm of a predictive engine;

receiving a first vector of scores from the first predictive algorithm of the predictive engine, the first vector of scores having been generated by the first predictive algorithm based on a first machine learning model that the first predictive algorithm developed during training, the first machine learning model configured to adapt and refine its scoring process over time to determine document importance, each score corresponding to a document in a set of documents, each score being generated based on historical human or machine decisions and leveraging past document reviews to identify patterns and relationships for determining the document importance;

receiving a second vector of scores from the second predictive algorithm of the predictive engine, the first predictive algorithm and the second predictive algorithm having operated in the predictive engine, the second vector of scores having been generated by the second predictive algorithm based on a second machine learning model that the second predictive algorithm developed during training, the second machine learning model configured to adapt and refine its scoring process over time to determine the document importance, each score corresponding to a document in the same set of documents, each score being generated based on historical human or machine decisions and leveraging past document reviews to identify patterns and relationships for the determining document importance;

(i) receiving ground truth labels indicating if each document of the set of documents is responsive or non-responsive;

(ii) calculating weights for blending the first vector of scores and the second vector of scores, where the weights are determined from a training process;

(iii) combining the first vector of scores and the second vector of scores using the calculated weights to generate a final ranking score for each document of the set of documents;

(iv) computing a ranked list of documents based on final ranking scores, wherein higher final ranking scores indicate documents of higher relevance;

(v) picking top N documents from the ranked list to form a batch for further review;

(vi) comparing the batch against the ground truth labels to identify responsive documents in the batch;

(vii) annotating documents in the batch according to the ground truth labels;

(viii) refining the first machine learning model and the second machine learning model by feeding the annotated documents back into the first predictive algorithm and the second predictive algorithm; and repeating steps (i)-(viii) until M responsive documents are identified, where M represents a predefined threshold.

2. The method of claim 1, wherein the first predictive algorithm is a Support Vector Machine (SVM).

3. The method of claim 1, wherein the second predictive algorithm is a Document Relation Engine (DRE).

4. The method of claim 1, wherein the training process includes utilizing a supervised learning algorithm to estimate the weights using the first vector of scores, the second vector of scores, and the ground truth labels.

5. The method of claim 4, wherein the supervised learning algorithm used to estimate the weights is a multi-layer perceptron neural network.

6. The method of claim 1, further comprising normalizing the scores in the first and second vectors to a predetermined range of values before calculating the weights.

7. The method of claim 1, wherein the ground truth labels indicate a value of one for the responsive documents and a value of zero for non-responsive documents.

8. The method of claim 1, wherein the final ranking score for each document is calculated by minimizing a squared error between the final ranking score and the ground truth labels.

9. The method of claim 1, wherein the final ranking score for each document is calculated by summing the scores for the responsive documents and non-responsive documents separately and then calculating a ratio of those sums.

10. The method of claim 1, wherein the final ranking score for each document is calculated based on positions of the documents in the first and second vectors of scores, with documents assigned higher positions for higher relevance.

11. The method of claim 10, further comprising using a softmax function to normalize a sum of the positions when calculating the weights.

12. A method comprising:

feeding an annotated seed set of documents into a first predictive algorithm and a second predictive algorithm of a predictive engine;

generating scores for each document of a set of documents using the first predictive algorithm based on a first machine learning model that the first predictive algorithm developed during training, the first machine learning model configured to adapt and refine its scoring process over time to determine document importance, each score being generated based on historical human or machine decisions and leveraging past document reviews to identify patterns and relationships for determining the document importance;

generating scores for each document of the set of documents using the second predictive algorithm based on a second machine learning model that the second predictive algorithm developed during training, the second machine learning model configured to adapt and refine its scoring process over time to determine the document importance, each score being generated based on historical human or machine decisions and leveraging past document reviews to identify patterns and relationships for determining the document importance;

(i) calculating weighted averages of the generated scores using the first predictive algorithm and the generated scores using the second predictive algorithm, based on weights that are determined from a training process;

(ii) computing a ranked list of documents based on the calculated weighted averages;

(iii) picking top N documents from the ranked list to form a batch for further review;

(iv) comparing the batch against ground truth labels to identify responsive documents in the batch;

(v) annotating documents in the batch according to the ground truth labels;

(vi) refining the first machine learning model and the second machine learning model by feeding the annotated documents back into the first predictive algorithm and the second predictive algorithm; and repeating steps (i-vi) until M responsive documents are identified, where M represents a predefined threshold.

13. A system, comprising:

a processor and memory for storing instructions, the processor executing the instructions to:

feed an annotated seed set of documents into a first predictive algorithm and a second predictive algorithm of a predictive engine;

apply the first predictive algorithm to generate scores for each document of a set of documents, the first predictive algorithm based on a first machine learning model that the first predictive algorithm developed during training, the first machine learning model configured to adapt and refine its scoring process over time to determine document importance, each score being generated based on historical human or machine decisions and leveraging past document reviews to identify patterns and relationships for determining the document importance;

apply the second predictive algorithm to generate scores for each document of the set of documents, the second predictive algorithm based on a second machine learning model that the second predictive algorithm developed during training, the second machine learning model configured to adapt and refine its scoring process over time to determine the document importance, each score being generated based on historical human or machine decisions and leveraging past document reviews to identify patterns and relationships for determining document the importance;

(i) calculate weighted averages of the generated scores of the first predictive algorithm and the generated scores of the second predictive algorithm, based on weights that are determined from a training process;

(ii) compute a ranked list of documents based on the calculated weighted averages;

(iii) pick top N documents from the ranked list to form a batch for further review;

(iv) compare the batch against ground truth labels to identify responsive documents in the batch;

(v) annotate documents in the batch according to the ground truth labels;

(vi) refine the first machine learning model and the second machine learning model by feeding the annotated documents back into the first predictive algorithm and the second predictive algorithm; and repeat steps (i-vi) until M responsive documents are identified, where M represents a predefined threshold.

14. The system of claim 13, wherein the first predictive algorithm is a Support Vector Machine (SVM) and the second predictive algorithm is a Document Relation Engine (DRE).

15. The system of claim 13, wherein the calculating the weighted averages includes applying a supervised learning algorithm to estimate the weights using the generated scores and the ground truth labels, wherein the supervised learning algorithm is a multi-layer perceptron neural network.

16. The system of claim 13, further comprising normalizing a first vector of scores generated by the first predictive algorithm and a second vector of scores generated by the second predictive algorithm to a predetermined range of values before calculating the weighted averages.

17. The system of claim 13, wherein the ground truth labels indicate a value of one for responsive documents and a value of zero for non-responsive documents.

18. The system of claim 13, wherein the calculating the weighted averages is performed by minimizing a squared error between the weighted averages and the ground truth labels.

19. The system of claim 13, wherein the weighted averages are calculated by summing the scores for responsive documents and non-responsive documents separately and then calculating a ratio of those sums, and wherein the weighted averages are calculated based on positions of the set of documents in scores generated by the first predictive algorithm and scores generated by the second predictive algorithm, with documents assigned higher positions for higher relevance.

20. The system of claim 19, further comprising using a softmax function to normalize a sum of the positions when calculating the weighted averages.

21. The method of claim 1, wherein the first predictive algorithm and the second predictive algorithm operate in the predictive engine simultaneously.

22. The method of claim 12, wherein the first predictive algorithm and the second predictive algorithm operate in the predictive engine simultaneously.

23. The system of claim 13, wherein the first predictive algorithm and the second predictive algorithm operate in the predictive engine simultaneously.

\*    \*    \*    \*    \*